United States Patent
Maeding

(10) Patent No.: US 11,846,255 B2
(45) Date of Patent: Dec. 19, 2023

(54) COMBUSTION CHAMBER SECTION WITH INTEGRAL BAFFLE AND METHOD OF MAKING A COMBUSTION CHAMBER SECTION

(71) Applicant: ArianeGroup GmbH, Taufkirchen (DE)

(72) Inventor: Chris Udo Maeding, Unterschleißheim (DE)

(73) Assignee: ArianeGroup GmbH, Taufkirchen (DE)

(*) Notice: Subject to any disclaimer, the term of this patent is extended or adjusted under 35 U.S.C. 154(b) by 60 days.

(21) Appl. No.: 17/463,602

(22) Filed: Sep. 1, 2021

(65) Prior Publication Data

US 2022/0090562 A1 Mar. 24, 2022

(30) Foreign Application Priority Data

Sep. 21, 2020 (DE) .......................... 102020124530.0

(51) Int. Cl.
*F02K 9/64* (2006.01)
*F02K 9/97* (2006.01)

(52) U.S. Cl.
CPC .................. *F02K 9/64* (2013.01); *F02K 9/972* (2013.01); *F05D 2230/20* (2013.01)

(58) Field of Classification Search
CPC .............. F02K 9/62; F02K 9/64; F02K 9/972
See application file for complete search history.

(56) References Cited

U.S. PATENT DOCUMENTS

| | | | | |
|---|---|---|---|---|
| 2,558,484 A | * | 6/1951 | Goddard | F02K 9/64 60/915 |
| 3,200,589 A | | 8/1965 | Mower et al. | |
| 3,242,668 A | * | 3/1966 | Ellis | F02K 9/56 60/260 |
| 3,242,670 A | * | 3/1966 | Buswell | F02K 9/52 60/258 |

(Continued)

FOREIGN PATENT DOCUMENTS

| | | |
|---|---|---|
| DE | 102017129321 A1 | 6/2019 |
| JP | 2002-535534 A | 10/2002 |

OTHER PUBLICATIONS

German Patent Office, Office Action issued in corresponding Application No. 10 2020 124 530.0, dated Apr. 21, 2021, 8 pp.

(Continued)

*Primary Examiner* — Kyle Robert Thomas
(74) *Attorney, Agent, or Firm* — Taft, Stettinius & Hollister

(57) ABSTRACT

A combustion chamber section for a combustion chamber for a rocket engine, the combustion chamber section including a combustion chamber body enclosing a combustion chamber volume and having coolant channels disposed therein, and at least one baffle integrally formed with the combustion chamber body and projecting from the combustion chamber body into the interior of the combustion chamber. The at least one baffle includes at least one coolant channel fluidly connected to at least one of the coolant channels in the combustion chamber body. Furthermore, an additive layer manufacturing method for manufacturing such a combustion chamber section is described.

14 Claims, 3 Drawing Sheets

(56) References Cited

U.S. PATENT DOCUMENTS

Figure 1:
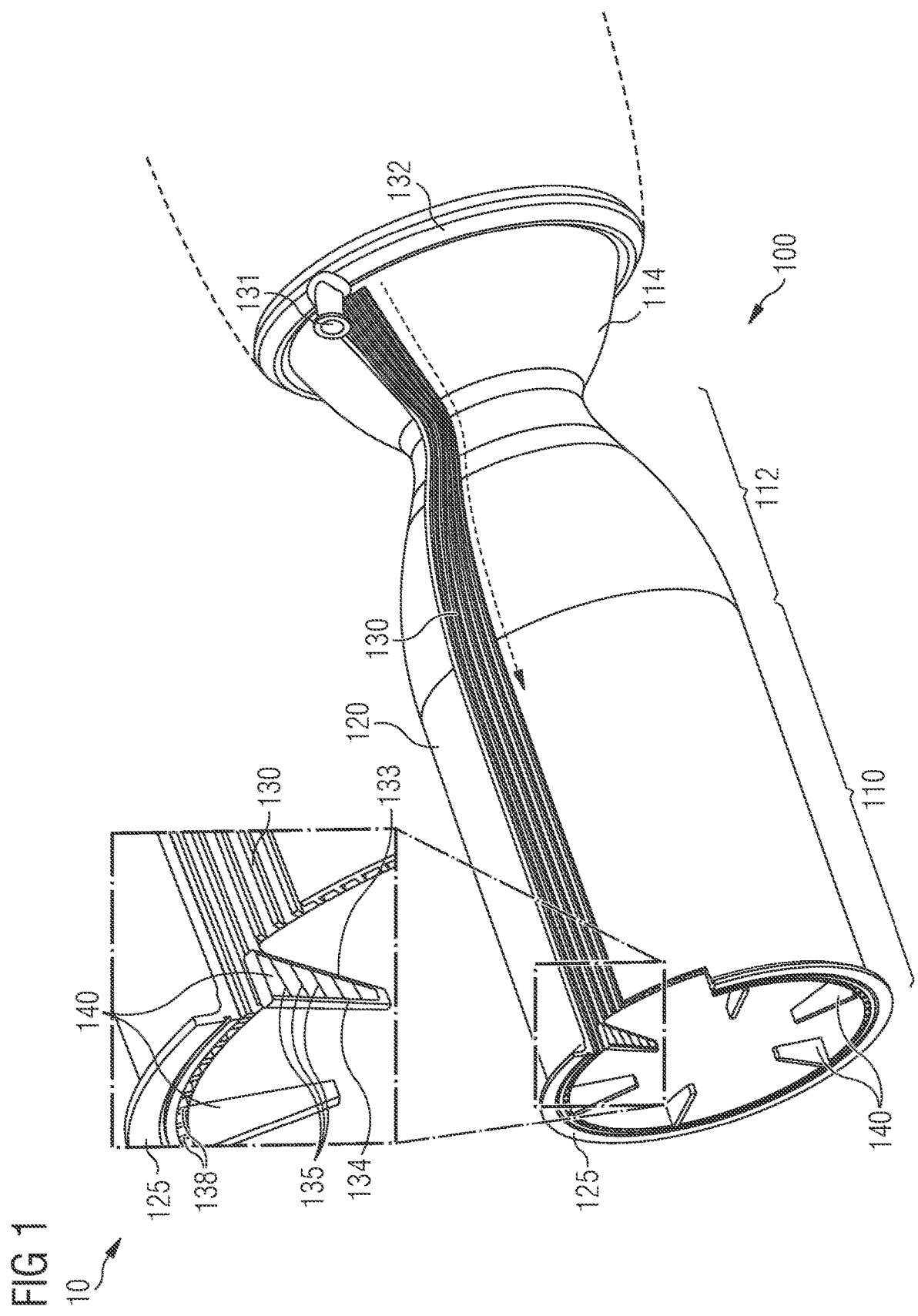

| | | | | |
|---|---|---|---|---|
| 4,055,044 A | * | 10/1977 | Dederra | F02K 9/64 |
| | | | | 239/127.3 |
| 6,640,538 B1 | * | 11/2003 | Preclik | F02K 9/64 |
| | | | | 239/127.3 |
| 2018/0087443 A1 | * | 3/2018 | Adriany | F28D 7/163 |

OTHER PUBLICATIONS

Gebhardt, A., "Generative Fertigungsverfahren," 4. Auglage, München, Carl Hanser Verlag, 2013. S. 21 bis 37.—ISBN 978-3-446-43652-7, 19 pp.

German Patent Office, English Translation of Office Action issued in corresponding Application No. 102020124530.0, dated Apr. 21, 2021, 8 pp.

JP Patent Office, JP Notice of Reasons for Rejection issued in corresponding JP Application No. 2021-149894, dated Sep. 26, 2022, 8 pgs.

JP Patent Office, JP Notice of Reasons for Rejection issued in corresponding JP Application No. 2021-149894, dated Mar. 7, 2023, 3 pgs.

* cited by examiner

COMBUSTION CHAMBER SECTION WITH INTEGRAL BAFFLE AND METHOD OF MAKING A COMBUSTION CHAMBER SECTION

The invention relates to a combustion chamber section with integrated baffle, a combustion chamber as well as a rocket engine with such a combustion chamber section, and a method for manufacturing such a combustion chamber section as well as a computer-readable medium with instructions for carrying out the manufacturing method. In particular, the invention relates to a combustion chamber section, having a combustion chamber body integrally formed with a baffle extending into the interior of the combustion chamber. Further described are a combustion chamber and a rocket engine having such a combustion chamber section, and an additive layer manufacturing method for manufacturing such a combustion chamber section, and a computer-readable medium having instructions for performing the additive layer manufacturing method.

Combustion chambers of liquid rocket engines are used for efficient combustion of the respective fuel pairing consisting of oxidizer and fuel. For this purpose, the fuel components are fed into the chamber via a special injection system. In the chamber, depending on the respective operating conditions, evaporation, mixing as well as chemical conversion and the incipient conversion into kinetic energy, the main increase of which is in the area of a subsonic and supersonic nozzle region, then takes place. The flow in the area of the combustion chamber is characterized by turbulent mixing. For reliable operation of the rocket engine high combustion stability is desirable.

Furthermore, cooling is necessary in particular in the area of the hot gas walls (inner walls of the combustion chamber and thrust nozzle). For example, in the case of regenerative cooling, the high heat generation can be damped via coolant channels in the hot gas walls through which at least one fuel component flows.

From the various shapes for combustion chambers, such as spherical, pear-shaped, conical, cylindrical or also in the form of an annular combustion chamber, the cylindrical combustion chamber configuration has become established. A cylindrical combustion chamber has advantages, particularly in production. However, combustion chambers with a round cross-section are more susceptible to high-frequency vibrations, especially transversal vibration modes, which correspond to the natural frequencies of these designs. These transversal vibrations, i.e. vibration propagation in the radial direction of the round combustion chamber, lead to additional energy release in the combustion chamber with associated overheating. Furthermore, there is a strong pressure fluctuation.

To counteract or avoid these vibrations, baffles have been arranged on the face plate (or injection plate) of the combustion chamber. In DE 10 2016 209 650 A1, instead of baffles, it is proposed to provide a certain number of coaxial injection elements on the face plate with a central sleeve body that protrudes further from the face plate into the interior of the combustion chamber than the other injection elements. The axial staggering of the flame front in the combustion chamber achieved in this way reduces or prevents the formation and/or propagation of vibrations in a similar way to baffles.

Against this background, the object of the present invention is to provide a structurally simpler way of reducing transversal vibrations in the combustion chamber.

This object is solved by a combustion chamber section with the features of claim 1, a combustion chamber with the features of claim 10, a rocket engine with the features of claim 11 as well as a method with the features of claim 12 and a corresponding data medium with instructions according to claim 13.

According to a first aspect to better understand the present disclosure, a combustion chamber section for a combustion chamber of a rocket engine comprises a combustion chamber body which encloses a combustion chamber volume and in which coolant channels are arranged. The combustion chamber body may consist of an outer shell and an inner shell, between which webs or similar separating elements are arranged to divide an intermediate space between the two shells into coolant channels. Fuel, for example, can flow through the coolant channels, which in the process heats up favorably for subsequent combustion and at the same time cools the combustion chamber body, in particular the inner shell.

The combustion chamber section can have any cross-sectional shape. For example, a cylindrical combustion chamber body can be used. Of course, the combustion chamber body can also have a polygonal (3-cornered, 4-cornered, 5-cornered or with an even higher number of corners and sides) or elliptical cross-section.

The combustion chamber section further comprises at least one baffleformed integrally with the combustion chamber body and projecting from the combustion chamber body into the interior of the combustion chamber (the combustion space). The arrangement of the at least one baffle on the inside of the combustion chamber body significantly simplifies the structure of the injection head and, in particular, of the injection plate for the combustion chamber. Since a large number of injection elements are provided in the injection plate, which have to be supplied with at least two fuel components, their construction is usually already quite complex and time-consuming. The additional arrangement of baffles or a partial number of specially shaped injection elements, as in conventional injection plates, increases the amount of work involved and thus the associated manufacturing costs. The combustion chamber body described here, on the other hand, allows simpler manufacture of the injection head and combustion chamber overall.

Integrally formed means here that the at least one baffle and the combustion chamber body are made of a continuous material. For example, the combustion chamber section, i.e. the combustion chamber body with integrated at least one baffle, can be manufactured using an additive layer manufacturing method (also referred to as 3D printing or ALM). Also, only parts of the combustion chamber body and/or baffle can be manufactured using an additive layer manufacturing method and be built on top of a section of the combustion chamber body and/or baffle manufactured elsewhere. Different materials can also be used in the additive layer manufacturing method. For example, a more heat-resistant material can be used on the radially inner sides and ends of the at least one baffle than on an outer side of the combustion chamber body.

The combustion chamber body and the baffle can also be manufactured separately from each other, and then attached to each other. This can be done, for example, by welding, soldering and/or (layer-by-layer) melting.

In addition, the at least one baffle may include at least one coolant channel fluidly connected to at least one of the coolant channels in the combustion chamber body. By providing a coolant channel in the at least one baffle, the at least one baffle can be actively cooled, greatly increasing the longevity of the baffle. Since coolant channels are already provided in most combustion chambers to cool the combustion chamber body, the fluidic connection with the coolant channel of the baffle is easy to establish. For example, at least one coolant channel extending in the longitudinal direction of the combustion chamber can be fluidly connected to the at least one coolant channel in the baffle.

Ivan implementation variant, the baffle may have a coolant inlet and a coolant outlet. A coolant inlet and coolant outlet means here that the corresponding coolant channel forms an opening on a sectional side of the baffle. Since the baffle is manufactured integrally with the combustion chamber body, a sectional side of the baffle here means an imaginary interface of the baffle at the boundary with the combustion chamber body if the baffle were separated from the combustion chamber body, for example.

Furthermore, the at least one coolant channel of the baffle may extend between the coolant inlet and the coolant outlet. Thus, the coolant inlet and the coolant outlet may be located at different positions of the baffle (and/or of the combustion chamber section), while the at least one coolant channel of the baffle extends inside the baffle.

In a further implementation variant, the coolant inlet of the baffle can be fluidly connected to the at least one of the coolant channels in the combustion chamber body. For example, when the combustion chamber section is manufactured using an additive layer manufacturing method, there is no actual opening in the baffle. Rather, a volume built up in the interior of the baffle forming the coolant channel in the baffle will transition to a volume forming the coolant channel in the combustion chamber body during the additive layer manufacturing method. In other words, the coolant channel in the combustion chamber body can merge into the coolant channel of the baffle, so that coolant flows through the interior of the baffle after flowing through the combustion chamber body and actively cools it.

In still another implementation variant, each of the coolant channels in the combustion chamber body may have a coolant outlet. This may be an actual opening, when viewing at the combustion chamber section, from which coolant may flow out after passing through the combustion chamber body. For example, a further coolant outlet of a coolant channel may be arranged in the combustion chamber body in a circumferential direction along a cross section of the combustion chamber body adjacent to one of the coolant outlets.

At locations where a baffle is provided, the coolant outlet of the baffle may be located adjacent to one of the coolant outlets of a coolant channel in the combustion chamber body. In other words, the coolant outlet of the baffle is located in the circumferential direction at a position that would correspond to a coolant outlet of a coolant channel in the combustion chamber body if no baffle with its own coolant channel were provided at this position. The coolant channels in the combustion chamber body and the baffle can be dimensioned in the circumferential direction such that an integer number of coolant channels in the combustion chamber body corresponds to the width of the baffle in the circumferential direction. At its end with the coolant outlets, the combustion chamber section can thus be designed like conventional combustion chambers without integrally formed baffles. This means that the combustion chamber section can also be used with conventional injection heads and injection plates.

In one implementation variant, a coolant channel in the combustion chamber body can end in the longitudinal direction of the combustion chamber body at the level of the coolant inlet of the baffle and open into the at least one coolant channel of the baffle. In other words, a coolant channel in the combustion chamber body at positions where a baffle is integrated can have a shorter design in the longitudinal direction of the combustion chamber body than the other coolant channels in the combustion chamber body that do not overlap with a baffle. This allows additional material to be provided on the combustion chamber body for fastening/integrating the baffle. Cooling of the combustion chamber body at the position where the baffle is arranged is not necessary, as the baffle itself is actively cooled.

In a further implementation variant, a first coolant channel in the baffle may be a coolant supply channel fluidically connected to the at least one coolant channel in the combustion chamber body. Further, the first coolant channel in the baffle may extend along a first side of the baffle. Moreover, a second coolant channel in the baffle may be a coolant discharge channel extending on a second side of the baffle. The first side and the second side of the baffle may be opposite sides of the baffle. For example, they may be substantially opposite sides of the baffle as viewed in the longitudinal direction of the combustion chamber section. Alternatively, they may be substantially opposite sides of the baffle as viewed in the circumferential direction of the combustion chamber section.

In this case, the first coolant channel may open into or merge with the second coolant channel so that the first and second coolant channels form a continuous volume, and the first and second sides of the baffle are cooled.

Alternatively or additionally, at least a third coolant channel can fluidically connect the coolant supply channel with the coolant discharge channel. The third coolant channel can be arranged on a third side of the baffle so that the third side is also cooled. The third side may be a side of the baffle located between the first and second sides of the baffle. Of course, the third coolant channel may be arranged at any position within the baffle, for example in the center of the baffle. In the case of a plurality of third coolant channels, they may extend at any position within the baffle, including a coolant channel along the third side of the baffle.

In this description of a coolant channel along one side of the baffle, the arrangement of the coolant channel in the edge region of the baffle is meant. In other words, the coolant channel is located relatively just below an outer surface of the baffle so that this surface is sufficiently cooled. The material of the baffle delimiting an inner surface of the coolant channel is for stability of the baffle. "Relatively just below an outer surface" here means a wall thickness of the baffle between the outer surface and the coolant channel that is sufficiently strong and heat resistant to be located inside the combustion chamber.

In still another implementation variant, a plurality of baffles may be integrally formed with the combustion chamber body and project into the interior of the combustion chamber. Further, all of the plurality of baffles may be connected at their inner end by an annular baffle (or also referred to as an inner baffle). Here, annular baffle does not mean exclusively a round shape. Rather, the shape of the annular baffle may correspond to the cross-sectional shape of the combustion chamber body in the area of the baffles. Such a baffle arranged inside the cross section of the combustion chamber body also serves to reduce or avoid transversal vibrations.

In one embodiment, the annular baffle may include at least one coolant channel fluidically coupled to the at least one coolant channel of the plurality of baffles. Alternatively, the coolant channel of the annular baffle may be fluidically coupled to one or more coolant channels of one or more of the plurality of baffles. This allows the inner annular baffle to be actively cooled.

In a further implementation variant, the at least one coolant channel of the annular baffle can comprise a coolant outlet which is arranged either on a side facing away from the combustion chamber or on a side facing the combustion chamber. Alternatively, a respective coolant outlet can also be provided on the side facing away from the combustion chamber and on the side facing towards the combustion chamber. In the case of a coolant outlet on the side facing away from the combustion chamber, the inner baffle can be designed to rest against the injection plate of the injection head. This allows the coolant outlet of the inner baffle to be used as a supply line for fuel (which is usually the coolant) into the combustion chamber head. In the case of a coolant outlet on the side facing the combustion chamber, the coolant outlet can be designed as an injection element or be designed to arrange an injection element therein. In this way, the inner baffle can also be designed as an injection element projecting into the combustion chamber.

According to a second aspect to better understand the present disclosure, a combustion chamber for a rocket engine comprises a combustion chamber section according to the first aspect or any of the implementation variants described with respect thereto.

According to a third aspect to better understand the present disclosure, a rocket engine comprises a combustion chamber section according to the first aspect or any of the implementation variants described with respect thereto or comprises a combustion chamber according to the second aspect.

According to a fourth aspect to better understand the present disclosure, a method for manufacturing a combustion chamber section according to the first aspect or one of its implementation variants comprises an additive layer manufacturing method, wherein the combustion chamber section is built up by the additive layer manufacturing method. In particular, in this regard, at positions where the coolant channels of the combustion chamber body and the at least one coolant channel of the baffle are located, no material can be joined together by the additive layer manufacturing method.

According to a fifth aspect to better understand the present disclosure, a computer-readable medium comprises instructions that, when executed on a processor, cause a machine to perform the additive layer manufacturing method according to the fourth aspect. These instructions may be CAD data or similar data that describes or defines the shape of the combustion chamber section according to the first aspect and/or the combustion chamber according to the second aspect, particularly such that a machine can form the combustion chamber section and/or the combustion chamber layer-by-layer.

The above described implementation variants and examples can of course be combined without this being explicitly described. Each of the described implementation variants is thus optional to any implementation variant or already combinations thereof. Thus, the present disclosure is not limited to the individual implementation variants and examples in the order described or any particular combination of the aspects and implementation variants.

Figure 2:
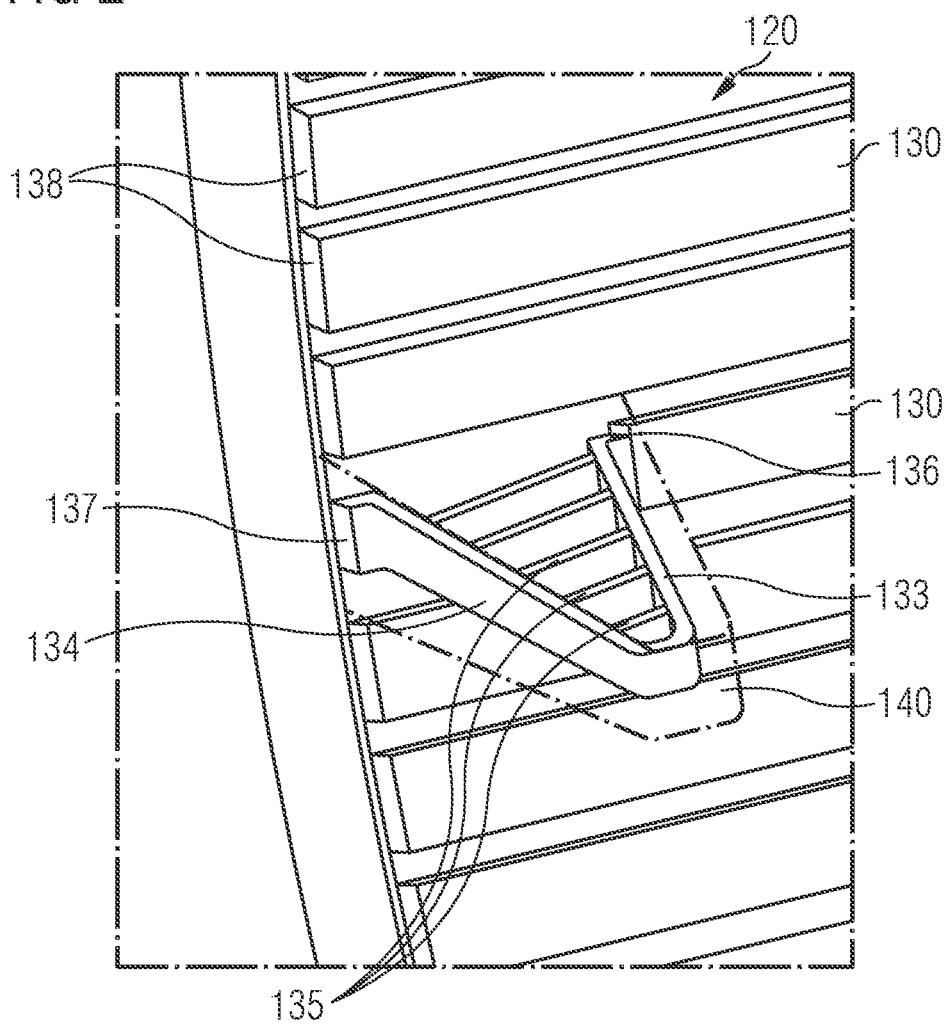

Preferred embodiments of the invention will now be explained in more detail with reference to the accompanying schematic drawings, wherein FIG. 1 schematically shows a perspective view of a combustion chamber;

FIG. 2 schematically shows a section of a combustion chamber section; and

Figure 3:
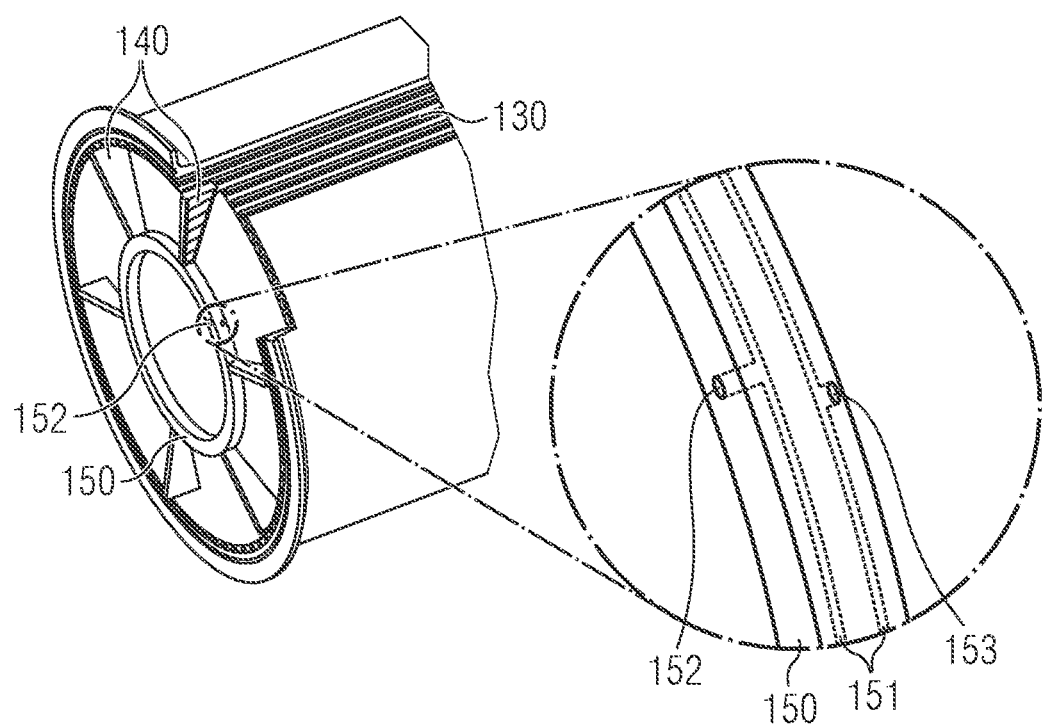

FIG. 3 schematically shows a detail of a combustion chamber section with annular baffle.

FIG. 1 schematically shows a perspective view of a combustion chamber 100, which can be used, for example, in a rocket engine 10. The nozzle of the rocket engine 10 is indicated in FIG. 1 by dashed lines only. The combustion chamber 100, as simplified in FIG. 1, includes a combustion chamber section 110 in which much of the mixing and combustion of the propellant components takes place. Downstream (in the direction of flow of the combustion gases) of the combustion chamber section 110 is a subsonic nozzle section 112 in which the combustion gases are accelerated, followed by a nozzle supersonic segment 114.

In the area of the nozzle supersonic segment 114, there is a connection 131 for coolant which opens into a distribution ring 132 (also called a distribution manifold). The distribution ring 132 extends in the circumferential direction and forms a continuous annular volume. Coolant channels 130 open into this volume or, viewed in the direction of coolant flow (indicated by a dashed arrow in FIG. 1), a plurality of coolant channels 130 begin in the distribution ring 132.

The combustion chamber section 110 comprises a combustion chamber body 120 which encloses a combustion chamber volume and in which the coolant channels 130 are also arranged. The combustion chamber section 110, shown cylindrically in FIG. 1, may assume any cross-sectional shape that serves to efficiently combust the fuel components. The combustion chamber section 110 further comprises at least one baffle 140 integrally formed with the combustion chamber body 120 and projecting from the combustion chamber body 120 into the interior of the combustion chamber.

A flange 125 is provided at the upstream end of the combustion chamber section 110 as viewed in the direction of flow of the combustion gases. This flange 125 is used to connect the injection head (not shown). As shown in the detailed view in FIG. 1, a plurality of coolant outlets 138 are located in the region of the flange 125, each coolant channel 130 in the combustion chamber body 120 having one such coolant outlet 138. The coolant outlets 138 are arranged adjacent one another in a circumferential direction along a cross-section of the combustion chamber body 120. The coolant outlets 138 may open into a distribution ring or collector ring, not shown, provided corresponding to the distribution ring 132 at the other end of the combustion chamber 100.

As can be seen in particular from the detailed view in FIG. 1, at least one of the baffles 140 has a coolant channel 133-135 for cooling the baffle 140. The coolant channel 133-135 is fluidically connected to at least one of the coolant channels 130 in the combustion chamber body 120.

FIG. 2 schematically shows a detail of a combustion chamber section 110, in which in particular the coolant channels 130 in the combustion chamber body 120 and the coolant channels 133-135 in the baffle 140 can be seen. The baffle 140 is shown as a trapezoidal shape only by way of example, but may take any shape to dampen vibrations within the combustion chamber section 110. The baffle 140 divides the combustion chamber volume into different sections, thereby suppressing or at least damping vibrations. Depending on the type of fuel, the vibrations may have different parameters, such that the baffle 140 must be correspondingly sized in the longitudinal and/or circumferential direction of the combustion chamber section 110 to dampen or suppress the vibrations that would otherwise occur.

The baffle 140 shown in FIG. 2 as an example has a coolant inlet 136 and a coolant outlet 137. The at least one coolant channel 133-135 of the baffle 140 extends between the coolant inlet 136 and the coolant outlet 137. For example, the coolant inlet 136 of the baffle 140 can be fluidically connected to at least one of the coolant channels 130 in the combustion chamber body 120. In a simple embodiment, as shown in FIG. 2, the baffle has a width in the circumferential direction of the combustion chamber body 120 that is slightly greater than the width of a coolant channel 130 in the combustion chamber body 120. Thus, the coolant channels 133-135 in the baffle 140 may have a width in the circumferential direction of the combustion chamber body 120 that is approximately equal to the width of a coolant channel 130 in the combustion chamber body 120. In particular, the cross-sectional area of the coolant channel 130 in the combustion chamber body 120 may correspond to the cross-sectional area of the coolant channel 133 or the coolant inlet 136 in the baffle 140.

The coolant inlet 136 of the baffle 140 may be fluidly connected to the at least one of the coolant channels 130 in the combustion chamber body 120. As can be seen in FIG. 2, the coolant channel 130 in the combustion chamber body 120 ends at the level of the coolant inlet 136 of the baffle 140, as viewed in the longitudinal direction of the combustion chamber body 120, so that the coolant channel 130 in the combustion chamber body 120 opens into the coolant channel 133 in the baffle 140. In contrast, when viewed in the longitudinal direction of the combustion chamber body 120, the adjacent coolant channels 130 in the combustion chamber body 120 are longer.

The coolant outlets 138 of each coolant channel 130 in the combustion chamber body 120 are adjacent to each other in the circumferential direction of the coolant body 120. In the region of the baffle 140, where the coolant channel 130 in the combustion chamber body 120 is shorter, the coolant outlet 137 of the baffle 140 is arranged adjacent to a coolant outlet 138 in the combustion chamber body 120. As a result, all coolant channels 130 in the combustion chamber body 120 and also the coolant channels 133-135 in the baffle 140 open into the collecting ring (not shown), as would also be the case with a plurality of coolant channels 130 in the combustion chamber body 120 without baffle 140. Therefore, the collecting ring and the components adjoining it do not have to be modified.

To achieve sufficient cooling of the baffle 140, the baffle 140 shown in FIG. 2 provides a first coolant channel 133, which is a coolant supply channel. The coolant supply channel 133 is fluidically connected to the (shorter) coolant channel 130 in the combustion chamber body 120. A second coolant channel 134 in the baffle 140 forms a coolant discharge channel and opens into the coolant outlet 137 of the baffle 140. The coolant supply channel 133 and the coolant discharge channel 134 are fluidically connected to each other. For example, they may be connected to each other via at least one third coolant channel 135. The greater the number of the at least one third coolant channel 135, the more uniformly coolant can flow through the baffle 140 and the more uniformly it is cooled.

Since the free tip of the baffle 140, which is spaced farthest from the combustion chamber body 120, extends farthest into the combustion chamber, this tip is also exposed to the highest heat load. In order to continue to be able to achieve uniform cooling, the distance between two third coolant channels 135 can become smaller as the distance from the combustion chamber body 120 increases.

In order to also cool the outer sides of the baffle 140 (viewed in the direction of flow of the combustion gases), the coolant supply channel 133 can run along a first side of the baffle 140 and the coolant discharge channel 134 can run along a second side of the baffle 140. Of course, the arrangement and the course of the coolant ducts 133-135 can be selected in deviation from the courses shown in such a way that coolant which is as cool as possible is guided past the hottest points of the baffle 140 to be expected.

FIG. 3 schematically shows a section of a combustion chamber section 110 with an annular guide 150. Both the combustion chamber section 110 and the annular guide 150 are shown in a circular shape. Of course, the annular baffle 150 can also assume another shape, for example a polygonal shape. This annular baffle 150 also divides the combustion chamber volume, thereby damping or avoiding vibrations.

The annular baffle 150 may also include at least one coolant channel 151, with FIG. 3 showing an example of two coolant channels 151 on opposite sides (as viewed in the direction of flow of the combustion gases) of the annular baffle 150. This at least one coolant channel 151 in the annular baffle 150 may be fluidically coupled to at least one coolant channel 133-135 in at least one of the baffles 140, such that coolant may flow from at least one of the baffles 140 into the annular baffle 150 to cool the annular baffle 150.

Optionally thereto, at least one of the coolant channels 151 of the annular baffle 150 may comprise a coolant outlet 152, 153. Such a coolant outlet 152, 153 of the annular baffle 150 can be arranged either on a side facing away from the combustion chamber 100 or on a side facing the combustion chamber 100. The coolant outlet 152 facing away from the combustion chamber 100 can be used as a coolant port to direct coolant into the injection head. On the other hand, a coolant outlet 153 arranged on the side of the baffle 150 facing the combustion chamber 100 can be used as an injection element.

For example, an injection element can be incorporated or integrated into the coolant outlet 153, whereby coolant (in this case, a fuel component) can be directed into the combustion chamber 100 in a region spaced from the injection plate (not shown).

Also optionally, coolant outlets (not shown) can also be arranged in the baffles 140. In this case, these coolant outlets can also be arranged on a side facing away from the combustion chamber 100 or on a side facing the combustion chamber 100 and fulfill the same functions as the coolant outlets 152, 153.

From FIGS. 2 and 3, it can be seen that the combustion chamber section 110 (or the entire combustion chamber 100) can be fabricated quite quickly and easily using an additive layer manufacturing method (3D printing or ALM). The material forming the baffle 140 and/or annular baffle 150 can be layered with the combustion chamber body 120, and the entire combustion chamber section 110 can be layered. All of the coolant channels 130, 133, 134, 135, 151 can thereby be fabricated by omitting joining of material and thus creating a cavity. The additive layer manufacturing method allows the different and possibly branched cavities forming the coolant channels 130, 133, 134, 135, 151 and coolant outlets 137, 138, 152, 153 to be produced in a simple manner. As a result, complex structures, especially in the area of the baffles 140, 150, can be realized which would not be possible with other manufacturing processes. Thus, baffles 140, 150 that can be cooled well can be provided in a simple manufacturing process, and in particular good vibration damping can also be achieved, irrespective of a complicated course of the coolant channels 130, 133, 134, 135, 151.

The invention claimed is:

1. A combustion chamber section for a combustion chamber for a rocket engine, the combustion chamber section comprising:
   a combustion chamber body which encloses an interior combustion chamber volume, the combustion chamber body having a longitudinal end configured to be connected to an injection head of the rocket engine,
   at least one baffle formed integrally with the combustion chamber body and projecting from the combustion chamber body into the combustion chamber volume,
   wherein a plurality of coolant channels are arranged in the combustion chamber body, some of the plurality of coolant channels of the combustion chamber body having a coolant outlet at the longitudinal end of the combustion chamber body,
   wherein the at least one baffle comprises a coolant inlet, a coolant outlet, and at least one coolant channel extending between the coolant inlet and the coolant outlet of the baffle, the at least one coolant channel fluidly connected to at least one of the coolant channels in the combustion chamber body, the coolant outlet of the at least one baffle being at the longitudinal end of the combustion chamber body,
   wherein, at the longitudinal end of the combustion chamber body, next to the coolant outlet of the at least one baffle, is arranged one of the coolant outlets of the some of the plurality of coolant channels of the combustion chamber body, and
   wherein a first coolant channel in the baffle is a coolant supply channel fluidically connected to the at least one coolant channel in the combustion chamber body and extending on a first side of the baffle, and wherein a second coolant channel in the baffle is a coolant discharge channel extending on a second side of the baffle.

2. The combustion chamber section according to claim 1, wherein the coolant inlet of the baffle is fluidly connected to the at least one of the coolant channels in the combustion chamber body.

3. The combustion chamber section according to claim 2, wherein a coolant channel in the combustion chamber body ends in the longitudinal direction of the combustion chamber body at the level of the coolant inlet of the baffle and opens into the at least one coolant channel of the baffle.

4. The combustion chamber section according to claim 3, wherein a plurality of baffles protrude into the interior of the combustion chamber, and wherein all of the plurality of baffles are connected at their inner end by an annular baffle.

5. The combustion chamber section according to claim 4, wherein the annular baffle comprises at least one coolant channel fluidly coupled to the at least one coolant channel of the plurality of baffles.

6. The combustion chamber section according to claim 5, wherein the at least one coolant channel of the annular baffle comprises a coolant outlet.

7. The combustion chamber section according to claim 6, wherein the coolant outlet of the annular baffle is arranged either on a side facing away from the combustion chamber volume or on a side facing the combustion chamber volume.

8. The combustion chamber section according to claim 3, wherein at least one third coolant channel fluidically connects the coolant supply channel to the coolant discharge channel.

9. A combustion chamber for a rocket engine comprising the combustion chamber section according to claim 1.

10. A rocket engine comprising:
   a combustion chamber section including
   a combustion chamber body which encloses an interior combustion chamber volume, the combustion chamber body having a longitudinal end configured to be connected to an injection head for the rocket engine,
   at least one baffle formed integrally with the combustion chamber body and projecting from the combustion chamber body into the combustion chamber volume,
   wherein a plurality of coolant channels are arranged in the combustion chamber body, some of the plurality of coolant channels of the combustion chamber body having a coolant outlet at the longitudinal end of the combustion chamber body,
   wherein the at least one baffle comprises a coolant inlet, a coolant outlet, and at least one coolant channel extending between the coolant inlet and the coolant outlet of the baffle, the at least one coolant channel fluidly connected to at least one of the coolant channels in the combustion chamber body, the coolant outlet of the at least one baffle being at the longitudinal end of the combustion chamber body,
   wherein, at the longitudinal end of the combustion chamber body, next to the coolant outlet of the at least one baffle, is arranged one of the coolant outlets of the some of the plurality of coolant channels of the combustion chamber body, and
   wherein a first coolant channel in the baffle is a coolant supply channel fluidically connected to the at least one coolant channel in the combustion chamber body and extending on a first side of the baffle, and wherein a second coolant channel in the baffle is a coolant discharge channel extending on a second side of the baffle; or
   the combustion chamber according to claim 9.

11. The combustion chamber section according to claim 1, wherein at least one third coolant channel fluidically connects the coolant supply channel to the coolant discharge channel.

12. The combustion chamber section according to claim 1, wherein a plurality of baffles protrude into the interior of the combustion chamber, and wherein all of the plurality of baffles are connected at their inner end by an annular baffle.

13. The combustion chamber section according to claim 12, wherein the annular baffle comprises at least one coolant channel fluidly coupled to the at least one coolant channel of the plurality of baffles; and
   wherein the at least one coolant channel of the annular baffle comprises a coolant outlet arranged either on a side facing away from the combustion chamber volume or on a side facing the combustion chamber volume.

14. A method of manufacturing a combustion chamber section including a combustion chamber body which encloses an interior combustion chamber volume, the combustion chamber body having a longitudinal end configured to be connected to an injection head for a rocket engine, a baffle formed integrally with the combustion chamber body and projecting from the combustion chamber body into the combustion chamber volume, a plurality of coolant channels being arranged in the combustion chamber body, some of the plurality of coolant channels of the combustion chamber body having a coolant outlet at the longitudinal end of the combustion chamber body, the baffle includes a coolant inlet, a coolant outlet, and at least one coolant channel extending between the coolant inlet and the coolant outlet of the baffle, the at least one coolant channel fluidly connected to at least one of the coolant channels in the combustion chamber body, the coolant outlet of the at least one baffle being at the longitudinal end of the combustion chamber body, and, at the longitudinal end of the combustion chamber body, next to the coolant outlet of the at least one baffle, is arranged one of the coolant outlets of the some of the plurality of coolant channels of the combustion chamber body, wherein a first coolant channel in the baffle is a coolant supply channel fluidically connected to the at least one coolant channel in the combustion chamber body and extending on a first side of the baffle, and wherein a second coolant channel in the baffle is a coolant discharge channel extending on a second side of the baffle, the method comprising:

building up the combustion chamber section by an additive layer manufacturing technique; and no material joining together by the additive layer manufacturing method at positions where the coolant channels of the combustion chamber body and the at least one coolant channel of the baffle are located.

\* \* \* \* \*